2 Sheets—Sheet 1.
H. ADKINS.
Harvester Rake.
No. 15,638. Patented Sept. 2, 1856.
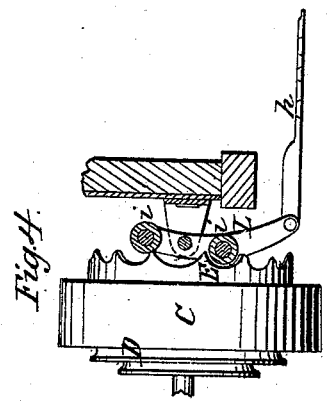
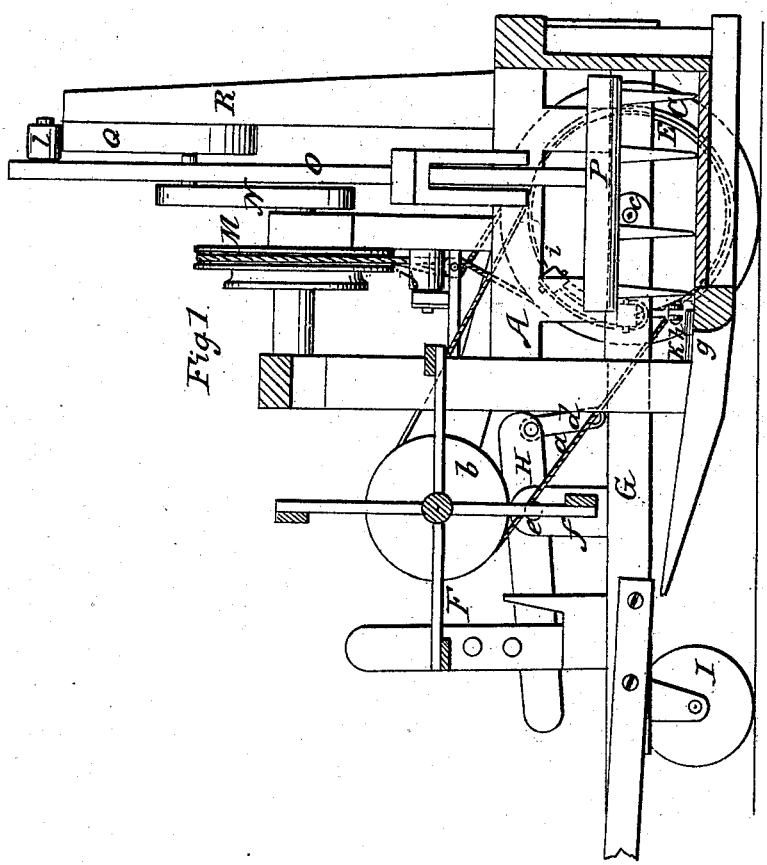

2 Sheets—Sheet 2.
H. ADKINS.
Harvester Rake.
No. 15,638.
Patented Sept. 2, 1856.
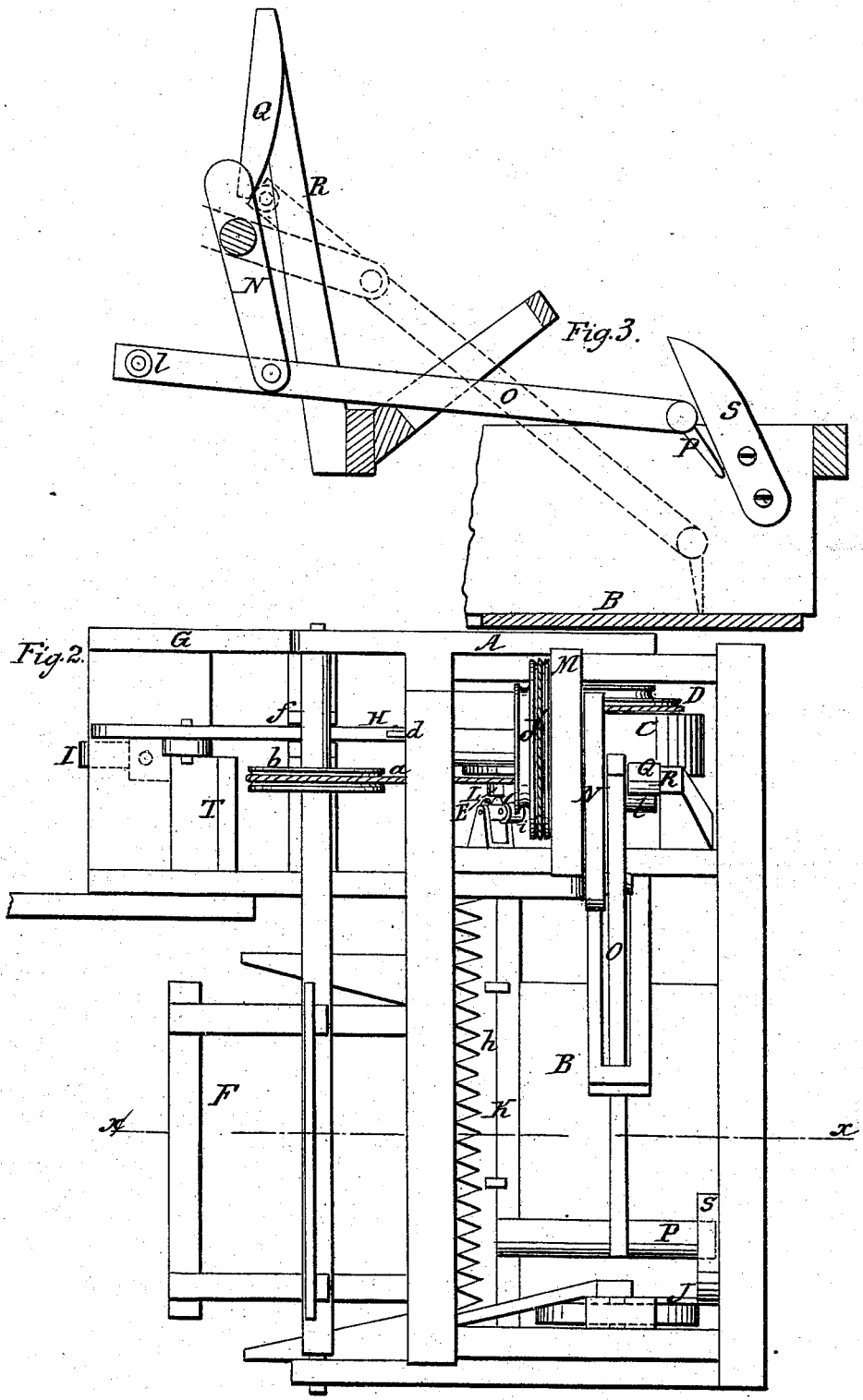

UNITED STATES PATENT OFFICE.

HOMER ADKINS, OF PLYMOUTH, ILLINOIS.

IMPROVEMENT IN HARVESTERS.

Specification forming part of Letters Patent No. 15,638, dated September 2, 1856.

*To all whom it may concern:*

Be it known that I, HOMER ADKINS, of Plymouth, in the county of Hancock and State of Illinois, have invented a new and Improved Grain and Grass Harvester; and I do hereby declare that the following is a full, clear, and exact description of the same, reference being had to the annexed drawings, making a part of this specification, in which—

Figure 1 is a longitudinal vertical section of my improvement, $x\,x$, Fig. 2, showing the plane of section. Fig. 2 is a plan or top view of the same. Fig. 3 is a detached view of the raking device. Fig. 4 is a detached view of the device by which the sickle is operated.

Similar letters of reference indicate corresponding parts in the several figures.

To enable others skilled in the art to fully understand and construct my invention, I will proceed to describe it.

A represents the main frame of the machine, to which frame the platform B is attached in any proper manner.

C represents the driving-wheel, which is placed within the frame A, and has a pulley, D, on its outer side and a notched or scalloped rim, E, on its inner side, as shown in Figs. 2 and 4.

F represents the reel, which is driven by a belt, $a$, which passes around the periphery of the rim E, and around a pulley, $b$, on the shaft of the reel F.

G represents a rectangular frame, the back end of which is attached by pivots $c$ to the main frame A, and H is a lever, the back end of which is connected by a link, $d$, to the front end of the main frame A. The lever H works on a pin, $e$, in the upper end of an upright, $f$, on the frame G. By raising and lowering the outer end of the lever H the front edge of the platform B will be raised and lowered, and the sickle, which is attached thereto, may be made to cut at the desired height from the ground. The front end of the frame G is supported by a swivel-wheel, I, and the outer side of the platform B is supported by a wheel, J.

The sickle K is formed of two cutters, $g\,h$, one of which, $g$, is stationary, and is attached to the front end of the platform B. The other cutter, $h$, vibrates over the cutter $g$. Both cutters have triangular or saw-shaped teeth. The cutter $h$ is vibrated by means of a lever, L, the lower end of which is attached to the cutter $h$. This lever is pivoted to the main frame A, and its upper end has two rollers, $i\,i$, fitted in it, as shown in Fig. 4, said rollers being acted upon by the notched or scalloped rim E as the wheel C rotates, the notched rim E actuating the lever L, which gives a vibrating or reciprocating motion to the cutter $h$.

On the upper part of the main frame A there is placed a pulley, M, around which a belt, $j$, passes, said belt also passing around a pulley, D, on the driving-wheel C. One end of the axis $k$ of the pulley M has a crank, N, attached to it, said crank having a bar, O, pivoted to it, the bar O having a rake, P, attached to its lower end, as shown clearly in Fig. 3. The upper or outer end of the bar O has a friction-roller, $l$, attached to it.

Q is a guide-block attached to an upright, R, on the main frame A, and S is a guide-block attached to the framing at the back part of the platform B. As the pulley M rotates the crank N gives a reciprocating motion to the bar O, and the rake P is drawn over the platform B in the direction indicated by the arrow, Fig. 3, the cut grain being discharged between the inner side of the platform and the driving-wheel C. The guide-blocks Q S assist in giving the proper movement to the bar O.

The swivel-wheel I assists in turning the machine, and also properly supports it. The driver's seat T is placed near the lever H, so that the height of the sickle K may be regulated with the greatest facility.

The above machine has been practically tested, and operates well in every respect. There is not much friction attending the operation of the several parts, nor are they liable to get out of repair.

What I claim as new, and desire to secure by Letters Patent, is—

The rake P, operated by means of the crank N, and guide-blocks Q S, substantially as described, for the purpose specified.

HOMER ADKINS.

Witnesses:
B. F. PETERSON,
LEWIS GRAHAM.